G. A. BOWERS.
Pan-Forming Machine.
No. 160,747. Patented March 16, 1875.
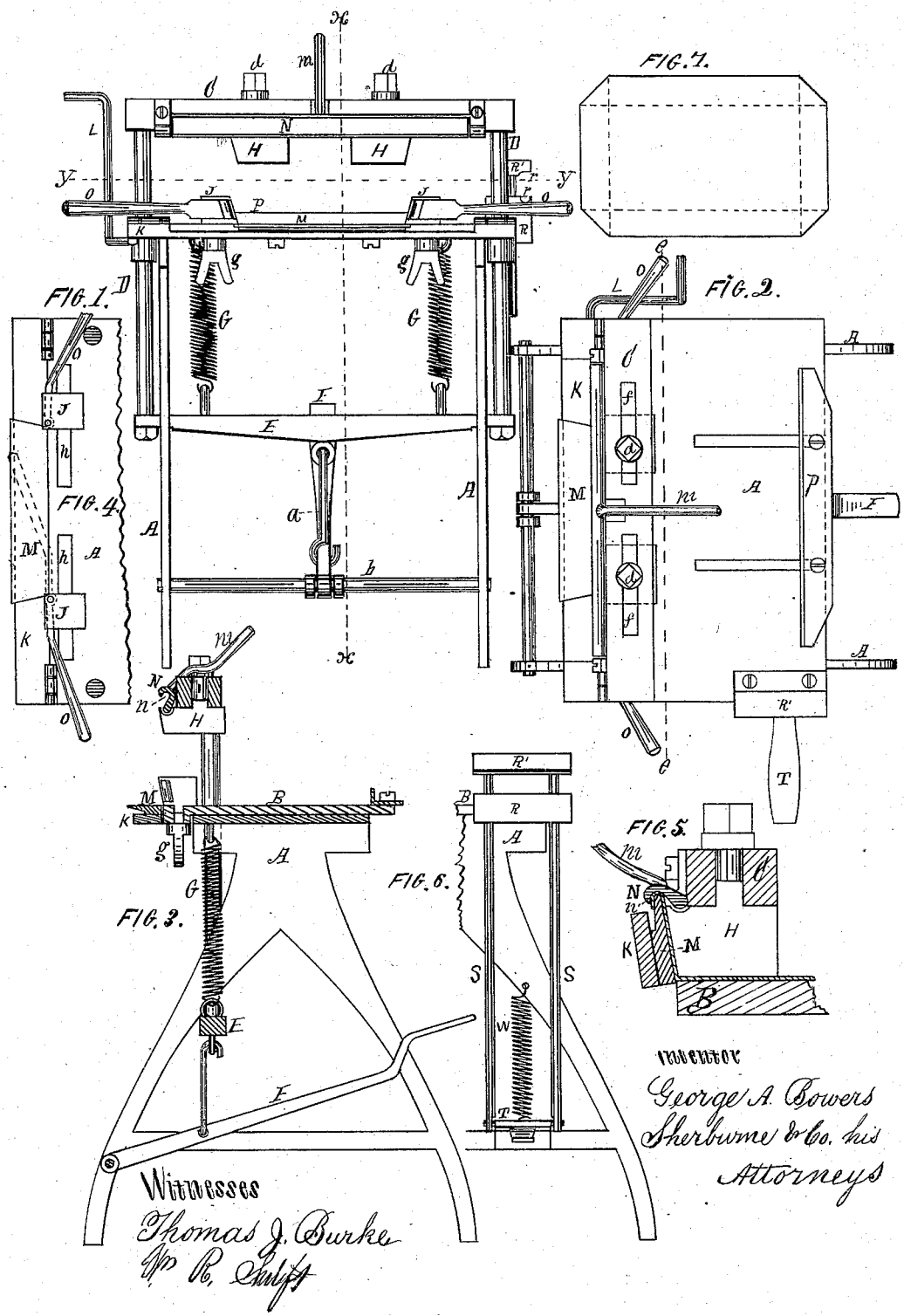

UNITED STATES PATENT OFFICE.

GEORGE A. BOWERS, OF CHICAGO, ILLINOIS, ASSIGNOR TO JOSEPH F. BONFIELD, OF SAME PLACE.

IMPROVEMENT IN PAN-FORMING MACHINES.

Specification forming part of Letters Patent No. 160,747, dated March 16, 1875; application filed June 2, 1874.

*To all whom it may concern:*

Be it known that I, GEORGE A. BOWERS, of Chicago, in the county of Cook and State of Illinois, have invented certain new and useful Improvements in Dripping-Pan Machines; and I do hereby declare the following to be a full, clear, and exact description thereof, which will enable others skilled in the art to which my invention appertains to make and use the same, reference being had to the accompanying drawing, forming part of this specification, in which—

Figure 1 is a rear elevation of a dripping-pan machine embodying my said improvements. Fig. 2 is a top view of the same. Fig. 3 is a vertical transverse section, showing those parts of the machine which are at the left hand of the line $x\ x$ drawn through Fig. 1. Fig. 4 is a plan of a portion of the machine-bed, taking in the operating parts which are under the line $y\ y$ drawn across Fig. 1, and to the left of the line $e\ e$ drawn across Fig. 2. Fig. 5 is an enlarged transverse section of the dies and former, showing the relative position of each when operating upon the blank forming the pan. Fig. 6 is an end view of a portion of the machine, showing a front elevation of the mechanism employed in securing the wire; and Fig. 7 is a general plan of the blank before being formed.

Similar letters of reference indicate like parts in the several figures of the drawing.

The object of my invention is to provide a machine by which the sides and ends of dripping-pans may be formed and wired at the top, thereby producing a cheaper and better article than when made by hand; and to that end it consists in a combination of dies and forming mechanisms, so arranged that by their joint action the ends and sides of the pan are bent to the proper shape and the upper edges turned to receive the wire; and in the mechanism to close the edges around the wire, all of which will be more fully understood by the following description and claims.

In the drawing, A represents the frame of the machine, and B the bed, which are substantially made of metal, as shown, or in any suitable form that will receive the operating parts. C is a cross-head, which is arranged slightly above the bed B, and extends longitudinally the entire length of the same. D D are depending rods, which are permanently attached to the ends of the cross-head, and extend downward through the bed to a point near the center of the frame, and are so arranged as to admit of a free and easy ascending and descending movement. Permanently attached to the lower extremity of these rods is a cross-beam, E, to which is attached a connecting-rod, $a$. This rod extends downward, and is attached to a treadle, F, fulcrumed to girt $b$ of the frame. G G are spiral springs, the upper ends of which are attached to the lower surface of the bed B, and their lower ends to the upper surface of the cross-beam E, as shown in Fig. 1, and their object is to hold the cross-head in an elevated position above the bed when the former is not positively acted upon by the treadle. H H are die-blocks, which are attached to the lower surface of the cross-head by means of bolts $d$ $d$ passing through elongated mortises $f\ f$, formed in the cross-head, and are so arranged as to admit of being moved longitudinally, and firmly secured at any requisite point thereon. The outer ends and rear sides of these blocks are beveled to correspond with the desired bevel of the sides and ends of the pan, as shown in Figs. 1, 3, and 5. J J are also die-blocks, which are attached to the upper surface of the bed, immediately under the cross-head, by means of thumb-screws $g\ g$, which pass through elongated mortises $h\ h$, formed in the bed, and are also so arranged as to admit of being moved longitudinally and firmly secured at the requisite point to bring their inner ends in the proper position to act on the sides of the pan between their beveled surfaces and the corresponding surfaces of the blocks H H, as the latter are moved downward by the action of the treadle. K is a forming-apron, which is hinged to the side or edge of the bed, and so arranged as to admit of a free and easy tilting movement. Permanently attached to one end of this apron is a lever, L, by which means the requisite tilting movement is imparted to the apron. Firmly secured to the upper surface of this apron is a core-plate, M, the outer edge of which projects outward to or slightly beyond the outer edge of the apron. The arrangement of this plate and the apron is such that as power is applied to the lever, imparting a tilting movement to the apron, the upper surface of the plate is brought in contact with the lower surface of the pan-blank, bending the same upon, and at its outer edge forming the sides and end of, the pan, which is pressed between the plate and beveled sides of the die-blocks when the same are in contact with the blank, producing the requisite pressure to insure a uniform bevel to the sides and ends of the pan. The outer edge of the plate is made round, as shown in Fig. 5, and its diameter is equal to the diameter of the wire to be used in forming the rim. Hinged to the side of the cross-head C, and immediately over the inner edge of the plate and outer edge of the bed, is a forming-brake, N, which is so arranged as to admit of a free and easy rocking movement. Permanently attached to the upper surface of this forming brake is a lever, m, by which the requisite rocking movement is imparted to the same. The upper edge of the forming-brake is bent, or so shaped as to form a longitudinal groove or channel, n, the diameter of which is slightly greater than the diameter of the rounded edge of the core-plate, as shown in Figs. 3 and 5. The forming-brake is so arranged as to bear against the edge of the upward-bent portion of the blank, when the cross-head is so adjusted as to bring the die-blocks in contact with the blank, and the core-plate tilted upward against the beveled sides of the die-blocks, and by a rocking movement of the brake, the edge of the blank is bent over the core-plate, between the rounded edge of the plate and inner surface of the groove, as shown in Fig. 5, forming the channel to receive the wire. O O are horizontal levers, which are hinged to the rear side of the die-blocks J J, as shown in Figs. 1 and 4. These levers are so arranged as to admit of being turned upon their hinges, so as to bring their rear faces against the upward-bent portion of the blank when the plate is in its normal position, the object of which is to bend the surplus metal at the corners of the pan, folding the same between the levers and outer sides of the die-blocks H H. P is an adjustable gage, which is attached to the upper surface of the bed, and so arranged as to admit of being moved toward or from the die-blocks J J, and firmly secured at any desired point, the object of which is to determine the height of the sides and ends of the pan. Permanently attached to the end of the bed is a die-block, R. (Shown in Figs. 1, 2, and 6.) The upper surface of this die is provided with a circular groove or channel, r, adapted to receive the rim at the upper edge of the pan. R' is the upper die-block, which is arranged slightly above the block R, and is rabbeted at its outer edge, as shown in Fig. 1, forming a recess, r', the inner shoulder of which is so shaped as to describe the arc of a circle corresponding with the circle of the groove in the lower die-block. S S are depending rods, which are permanently attached to the upper die-block R', and extended downward through the lower die-block R to a point near the lower extremity of the main frame. These rods are pivoted at their lower ends to a treadle, T, which is hinged to the main frame, and are so arranged as to admit of a free and easy ascending and descending movement. Permanently attached to the upper surface of the treadle T is a spiral spring, W, which extends upward, and is attached at its upper end to the main frame, as shown in Fig. 6. The object of this spring is to hold the upper die-block R' in an elevated position above the lower die-block R, when not positively acted upon by the treadle.

It is found that with the machines now in use, when turning the sides and ends of the pan, the action of the machine is such as to bend the surplus metal forming the lap at the corners, first to the right and then to the left, or giving the same two separate and distinct turns, which is more or less liable to break the fibers of the metal, destroying the strength of the pan and causing the same to break, while with my machine this difficulty is entirely overcome, for the arrangement of the dies and core-plate is such that, as the sides and ends are bent, the surplus metal forming the lap is only compressed together, which extends outward between the corners of the core-plate and dies at an angle of forty-five degrees to the plane of the sides of the pan, and by turning the levers the lap is bent around against the end with but one turn, making but one bend in the metal, which may be done without injury to the fibers.

In using my invention its operation is as follows: The blank from which the pan is formed is cut in the usual shape, as shown in Fig. 7. Gage P is then so adjusted that, when the blank is placed on the bed and its side against the face of the gage, the opposite side of the blank will extend over the core-plate sufficiently to bring the dotted line on the blank to a vertical plane with the inner edge of the plate, the die-blocks J J being first removed. Power is then applied to treadle F, forcing cross-head C downward, bringing die-blocks H H in contact with the upper surface of the blank. Apron K is then tilted upward by means of lever L, bringing core-plate M against the lower surface of the blank at its outer edge, and by a further downward movement of the lever the edge of the blank is bent upward and forced against the beveled sides of the die-blocks. A rocking movement is then imparted to the forming-brake N by means of lever m, which causes the edge of the forming-brake to seize the upper edge of the blank, and thus bends the latter over the upper edge of the core-plate, and by a further movement of the forming-brake the bent edge of the blank is pressed between the rounded edge of the core-plate and inner surface of the groove in the forming-brake, which forms the groove in the blank to receive the wire. The blank is then removed and gage P readjusted, so as to bring the dotted line on the opposite side of the blank in a plane with the inner edge of the core-plate, and the operation repeated, as before, which forms the sides of the pan. The gage is then so adjusted as to bring the dotted line across the end of the pan in a vertical plane with the inner edges of the core-plate, and die-blocks J J so adjusted as to bring their beveled ends against the sides of the pan. The operation is again repeated, as before, bending the end of the pan. The apron is then moved back to its normal position, and levers O O moved around against the end of the pan, which carry with them the surplus metal forming the lap. The gage is then readjusted, and the operation repeated, as before, thus finishing the pan ready for the wire. The latter is then placed in the groove and the upper edge of the pan placed between the die-blocks R R', allowing the outer edge of the pan to rest in groove r of the die-block. Power is then applied to treadle T, forcing die-block R' downward upon the inner surface of the pan, compressing the edge of the pan between the die-blocks, thus completing the turn of the metal around the wire, and the pan is complete.

Having thus described my invention, I claim—

1. In combination with the movable cross-head C and mechanism to elevate and depress the same, the adjustable die-blocks H H J J and tilting core-plate M, as specified.

2. In combination with core-plate M, the forming-brake N, operating as described.

3. In combination with the core-plate M, the adjustable die-blocks H H and J J, provided with the levers O O, all arranged and operated substantially as and for the purpose specified.

4. In combination with the die-block R, provided with the circular groove r, the rabbeted die-block R', operating as specified, whereby the edges of the metal are closed around the wire, as described.

The above specification of my invention signed by me this 26th day of May, 1874.

GEORGE A. BOWERS.

Witnesses:
 THOMAS J. BURKE,
 WM. R. SWIFT.